United States Patent
Kim et al.

(10) Patent No.: US 9,979,873 B2
(45) Date of Patent: *May 22, 2018

(54) ATTACHABLE DIGITAL PHOTOGRAPHING SYSTEM AND OPERATION METHOD THEREOF

(71) Applicant: SAMSUNG ELECTRONICS CO., LTD., Suwon-si, Gyeonggi-do (KR)

(72) Inventors: Sang-tae Kim, Suwon-si (KR); Dong-jun Kum, Yongin-si (KR); Yun-je Oh, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days. days.

This patent is subject to a terminal disclaimer.

(21) Appl. No.: 15/402,720

(22) Filed: Jan. 10, 2017

(65) Prior Publication Data

US 2017/0118392 A1 Apr. 27, 2017

Related U.S. Application Data

(63) Continuation of application No. 13/590,350, filed on Aug. 21, 2012, now Pat. No. 9,568,806.

(30) Foreign Application Priority Data

Dec. 1, 2011 (KR) .................. 10-2011-0127860

(51) Int. Cl.
*H04N 5/225* (2006.01)
*H04N 5/232* (2006.01)
(Continued)

(52) U.S. Cl.
CPC ......... *H04N 5/23209* (2013.01); *G03B 17/02* (2013.01); *G03B 17/12* (2013.01);
(Continued)

(58) Field of Classification Search
CPC . H04W 4/008; H04N 5/2254; H04N 5/23209; G03B 17/02; G03B 17/12; G03B 17/14; G03B 29/00; G03B 17/16
(Continued)

(56) References Cited

U.S. PATENT DOCUMENTS 6,052,509 A 4/2000 Abe
6,101,339 A 8/2000 Miki et al.
(Continued)

FOREIGN PATENT DOCUMENTS

JP 2002-335434 A 11/2002
JP 2005-020098 A 1/2005
(Continued)

OTHER PUBLICATIONS

Ridden, "WVIL Concept: Digital SLR meets mobile phone, with an ingenious twist," Apr. 28, 2011, pp. 1-3.
(Continued)

*Primary Examiner* — Ngoc-Yen Vu
(74) *Attorney, Agent, or Firm* — Drinker Biddle & Reath LLP

(57) ABSTRACT

A digital photographing system includes a smart mount that includes lenses, a shutter, an image sensor, and an image processor, combined with a camera body or a mobile terminal device. A method of operating the digital photographing system is provided. The digital photographing system includes a lens; a smart mount that captures and processes an image of an object input via the lens; and a body that displays, modifies, stores, or deletes the image captured and processed by the smart mount.

20 Claims, 8 Drawing Sheets

(51) Int. Cl.
  *G03B 17/02* (2006.01)
  *G03B 29/00* (2006.01)
  *G03B 17/12* (2006.01)
  *H04N 5/907* (2006.01)
  *H04W 76/02* (2009.01)
  *H04N 5/228* (2006.01)
  *G03B 17/14* (2006.01)
  *H04N 5/217* (2011.01)
  *H04W 4/00* (2018.01)

(52) U.S. Cl.
  CPC ........... *G03B 29/00* (2013.01); *H04N 5/2254* (2013.01); *H04N 5/23245* (2013.01); *H04N 5/907* (2013.01); *H04W 76/02* (2013.01); *G03B 17/14* (2013.01); *H04N 5/2171* (2013.01); *H04N 2201/0084* (2013.01); *H04W 4/008* (2013.01)

(58) Field of Classification Search
  USPC ............................ 348/207.1, 222.1, 373–376
  See application file for complete search history.

(56) References Cited

U.S. PATENT DOCUMENTS

| | | |
|---|---|---|
| 6,628,326 B1 | 9/2003 | Manico et al. |
| 7,522,828 B2 | 4/2009 | Doi et al. |
| 7,649,550 B2 | 1/2010 | Ishiyama et al. |
| 7,663,666 B2 | 2/2010 | Kawai et al. |
| 8,416,340 B2 | 4/2013 | Shintani |
| 8,704,944 B1 | 4/2014 | Wierzoch et al. |
| 9,357,126 B2 | 5/2016 | Ishii et al. |
| 9,451,143 B2 | 9/2016 | Shinozaki et al. |
| 2005/0174434 A1 | 8/2005 | Chang et al. |
| 2006/0099939 A1* | 5/2006 | Uchikawa ......... H04M 1/72525 455/418 |
| 2007/0098385 A1 | 5/2007 | Tanaka et al. |
| 2007/0126883 A1 | 6/2007 | Ishige et al. |
| 2007/0147815 A1 | 6/2007 | Tanaka |
| 2007/0248356 A1 | 10/2007 | Toji |
| 2007/0254640 A1 | 11/2007 | Bliss |
| 2007/0263366 A1 | 11/2007 | Wu et al. |
| 2007/0285498 A1 | 12/2007 | Shiomi |
| 2010/0145146 A1 | 6/2010 | Melder |
| 2010/0295963 A1 | 11/2010 | Shintani |
| 2011/0087135 A1 | 4/2011 | Ferzli et al. |
| 2012/0045989 A1 | 2/2012 | Suumaki et al. |
| 2012/0329388 A1 | 12/2012 | Royston et al. |
| 2014/0160304 A1 | 6/2014 | Galor et al. |
| 2015/0237249 A1 | 8/2015 | Sato et al. |
| 2015/0381887 A1 | 12/2015 | Sato et al. |
| 2016/0014318 A1* | 1/2016 | Okabe .................... G03B 17/02 348/207.1 |
| 2016/0269514 A1 | 9/2016 | Ito et al. |
| 2017/0031235 A1* | 2/2017 | Kubotera ............... G03B 17/04 |

FOREIGN PATENT DOCUMENTS

| | | |
|---|---|---|
| KR | 10-2003-0061980 A | 7/2003 |
| KR | 10-2006-0033273 A | 4/2006 |
| KR | 20-2011-0001534 U | 2/2011 |

OTHER PUBLICATIONS

Office Action issued in related application KR 10-2011-0127860, dated Jun. 15, 2017, with English language translation, 13 pages.
Office Action issued in related application KR 10-2017-0121894, Dec. 18, 2017, with English language translation, 10 pages.

\* cited by examiner

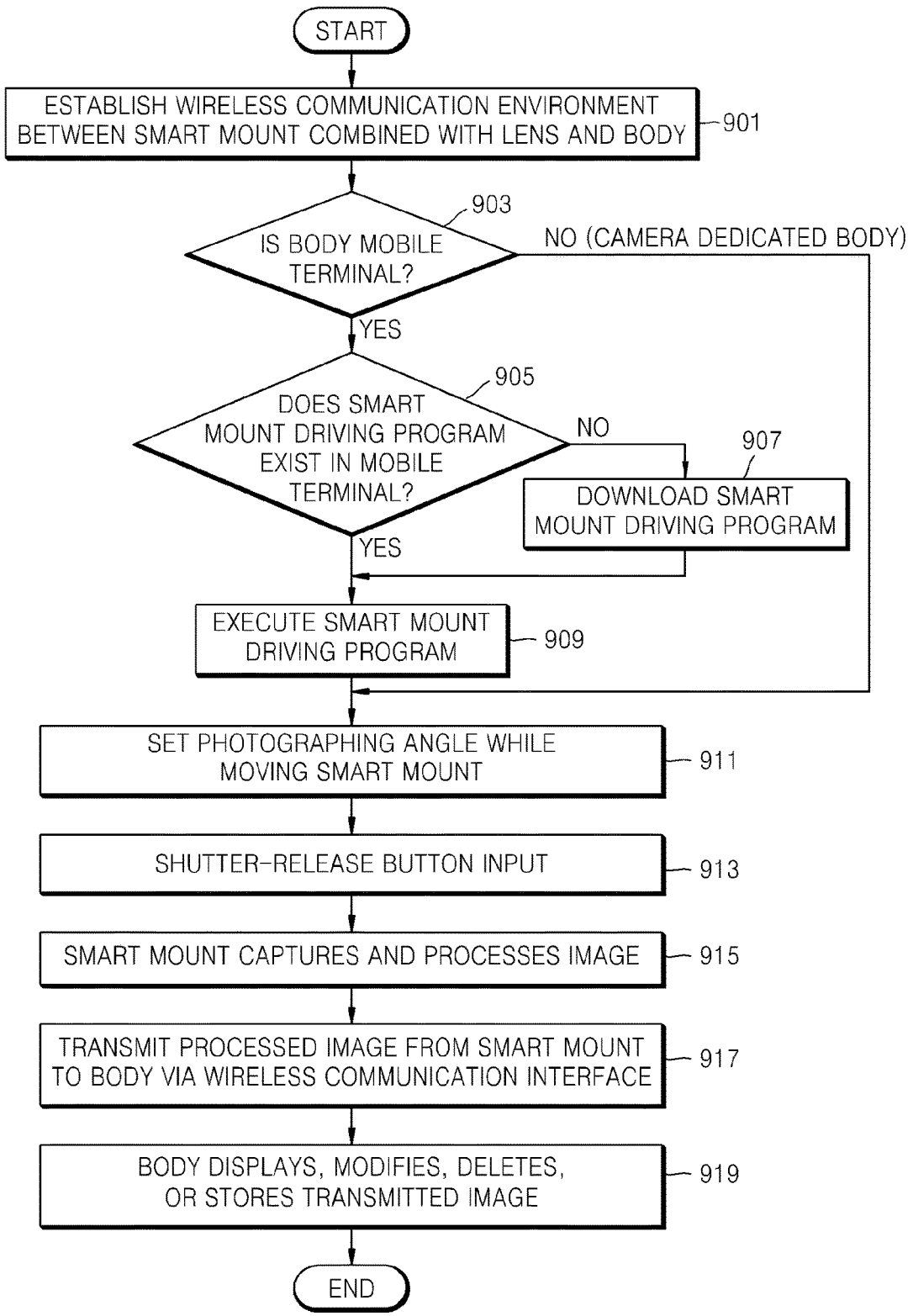

ATTACHABLE DIGITAL PHOTOGRAPHING SYSTEM AND OPERATION METHOD THEREOF

CROSS-REFERENCE TO RELATED PATENT APPLICATIONS

This application is a continuation of U.S. patent application Ser. No. 13/590,350, filed Aug. 21, 2012, which claims the priority benefit of Korean Patent Application No. 10-2011-0127860, filed on Dec. 1, 2011, in the Korean Intellectual Property Office, the disclosures of which are incorporated herein in their entirety by reference.

BACKGROUND

Various embodiments relate to a digital photographing system that is a combination of a smart mount including lenses, a shutter, an image sensor, and an image processor, and a camera body or a mobile terminal device, and relate a method of operating the digital photographing system.

Lately, various types of digital photographing devices are being released in the market. Examples of digital photographic devices include a lens-exchangeable digital photographing device, in which a lens and a body may be separated from each other and the lens may be exchanged with various types of lenses, a camera unit exchangeable digital photographing device, in which a camera body and a camera unit may be separated and the camera unit may be exchanged with other camera units, a digital photographing system for photographing by attaching a mount for using super-expensive lenses from Canon and Nikon to Apple iPhones, etc.

SUMMARY

Various embodiments provide a digital photographing system that is a combination of a smart mount including lenses, a shutter, an image sensor, and an image processor, and a camera body or a mobile terminal device, and provide a method of operating the digital photographing system.

According to an embodiment, there is provided a digital photographing system including a lens; a smart mount that captures and processes an image of an object input via the lens; and a body that displays, modifies, stores, or deletes the image captured and processed by the smart mount.

The smart mount may include a lens connecting unit that connects with the lens; a shutter; an image sensor that converts object light incident to the lens to electric signals according to an input of the shutter; and an image processing unit that processes data from the image sensor to displayable or storable signals and transmits the displayable or storable signals to the body.

The smart mount may further include a storage unit that stores an image.

The smart mount may be operable to be attached to or detached from the body.

The smart mount may transmit captured and processed images to the body while the smart mount is detached from the body.

The smart mount may capture and process images according to control signals received from the body while the smart mount is detached from the body.

The smart mount may perform wired communication or wireless communication with the body.

The digital photographing apparatus may further include buttons for capturing and processing of images, wherein the buttons are arranged outside the smart mount.

The smart mount may be attached to the body via a connecting unit arranged inside the smart mount.

The smart mount may be attached the body via a separate adaptor.

The smart mount may operate based on power received from the body.

The smart mount may include a battery for autonomous power supply.

The body may be at least one of a digital camera body and a mobile terminal device.

The body may control an image capturing operation and an image processing operation of the smart mount.

If the body is a mobile terminal device, an application for controlling an image capturing operation and an image processing operation of the smart mount may be downloaded and executed on the mobile terminal device.

According to another embodiment, there is provided a method of operating a digital photographing system of claim, the method including attaching a smart mount that is operable to capture and process images to a body including at least one of a camera body and a mobile device; inputting an image capturing signal when a photographing angle is set; capturing and processing an image by the smart mount when the smart mount receives the image capturing signal, and transmitting the image to the body; and displaying, modifying, storing, or deleting the transmitted image at the body.

According to another embodiment, there is provided a method of operating a digital photographing system, the method including establishing a wireless communication environment between a smart mount that is operable to capture and process images and a body including at least one of a camera body and a mobile device; moving the smart mount, setting a photographing angle, and inputting an image capturing signal; capturing and processing an image by the smart mount when the smart mount receives the image capturing signal, and wirelessly transmitting the image to the body; and displaying, modifying, storing, or deleting the transmitted image at the body.

If the body is a mobile terminal device, an application for controlling an image capturing operation and an image processing operation of the smart mount may be downloaded and executed on the mobile terminal device.

The inputting of the image capturing signal may include at least one of transmitting the image capturing signal from the body to the smart mount and inputting the image capturing signal using a button arranged on the smart mount.

The smart mount may either receive power supplied from the body or includes a battery for autonomous power supply.

BRIEF DESCRIPTION OF THE DRAWINGS

The above and other features and advantages will become more apparent by describing in detail exemplary embodiments thereof with reference to the attached drawings in which:

FIG. 9 is a flowchart showing a method of operating a digital photographing system, according to another embodiment.

DETAILED DESCRIPTION

Figure 1A:
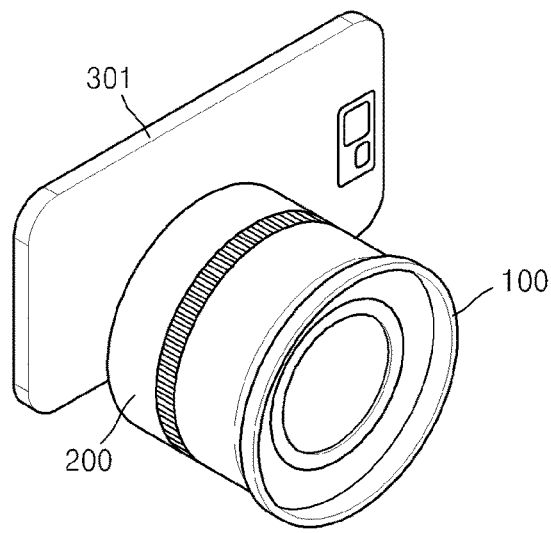
FIGS. 1A to 1C and 2A to 2C are perspective views of a digital photographing system, according to an embodiment.

Various embodiments now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

It will be understood that although the terms first and second are used herein to describe various elements, these elements should not be limited by these terms. These terms are only used to distinguish one element from another element. Thus, a first element discussed below could be termed a second element, and similarly, a second element may be termed a first element without departing from the teachings of this disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, various embodiments will be described in detail by explaining preferred embodiments of the invention with reference to the attached drawings. Like reference numerals in the drawings denote like elements.

FIGS. 1A to 1C and 2A to 2C are perspective views of a digital photographing system, according to an embodiment.

Figure 1B:
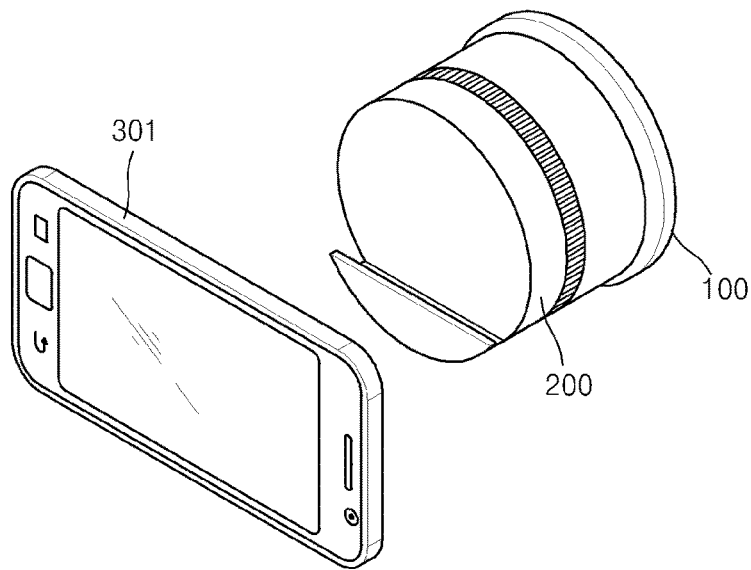
Figure 1C:
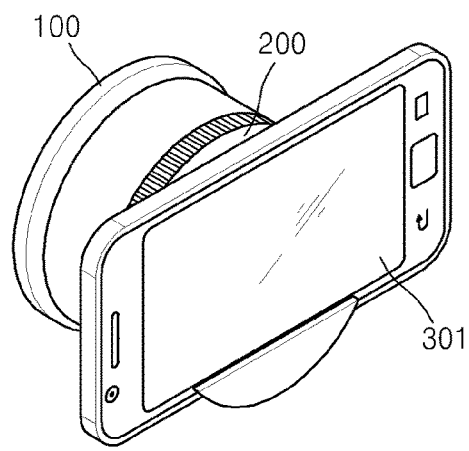
Figure 2A:
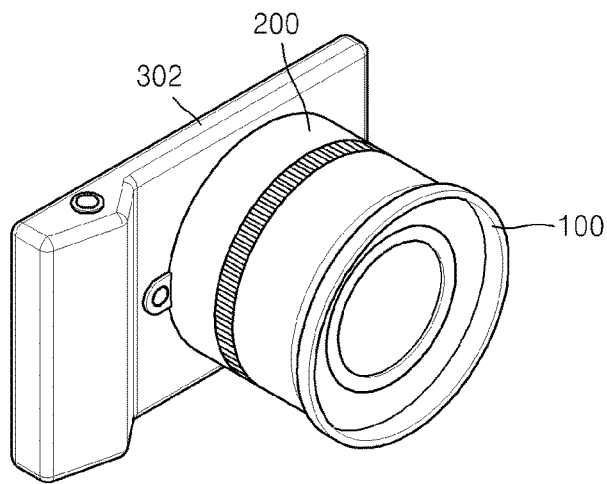
Figure 2B:
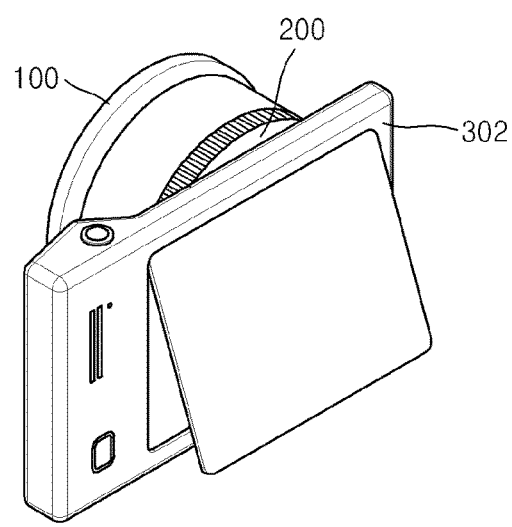
Figure 2C:
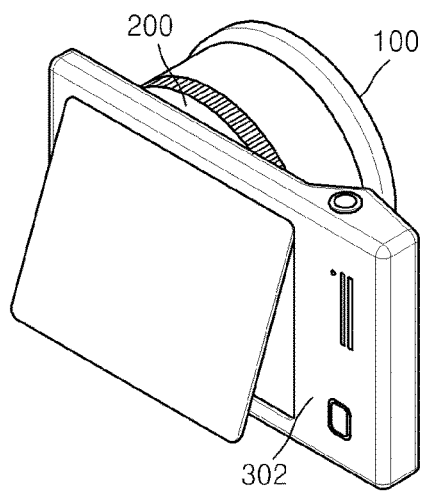
Figure 3:
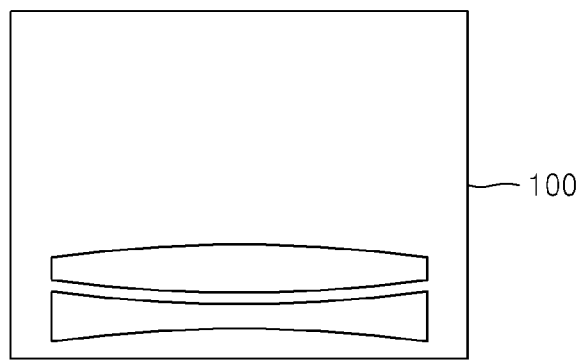
FIG. 3 is a sectional view of the digital photographing system shown in FIGS. 1A to 1C and 2A to 2C, according to an embodiment.
Figure 3:
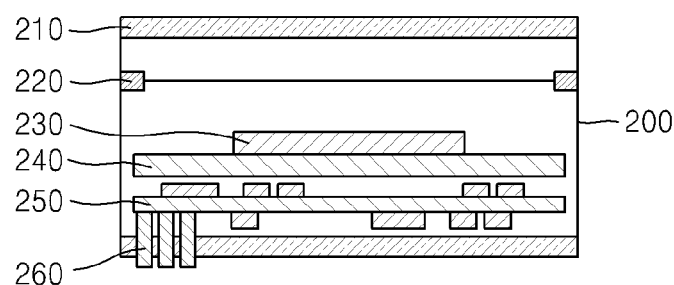
Figure 3:
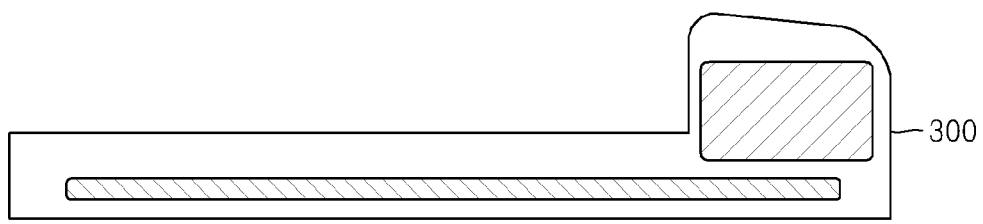

Referring to FIGS. 1A to 1C and 2A to 2C, the digital photographing system includes a lens 100, a smart mount 200, and a body 300 (as shown in FIG. 3). In the various embodiments, the body 300 may be a mobile terminal device 301 or a camera body 302.

FIGS. 1A through 1C show the lens 100 and the smart mount 200 connected to the mobile terminal device 301. FIG. 1A is a lateral view of the digital photographing system, FIG. 1B is a diagram showing the mobile terminal device 301 and the smart mount 200 separated from each other, and FIG. 1C is a rear view of the digital photographing system.

FIGS. 2A through 2C show the lens 100 and the smart mount 200 combined with the camera body 302. FIG. 2A is a lateral view of the digital photographing system, and FIGS. 2B and 2C are rear views of the digital photographing system. Although not shown, the camera body 302 and the smart mount 200 may be separated.

FIG. 3 is a sectional view of the digital photographing system shown in FIGS. 1A to 1C and 2A to 2C, and FIG. 4 is a detailed view of the smart mount 200, according to an embodiment.

Figure 4:
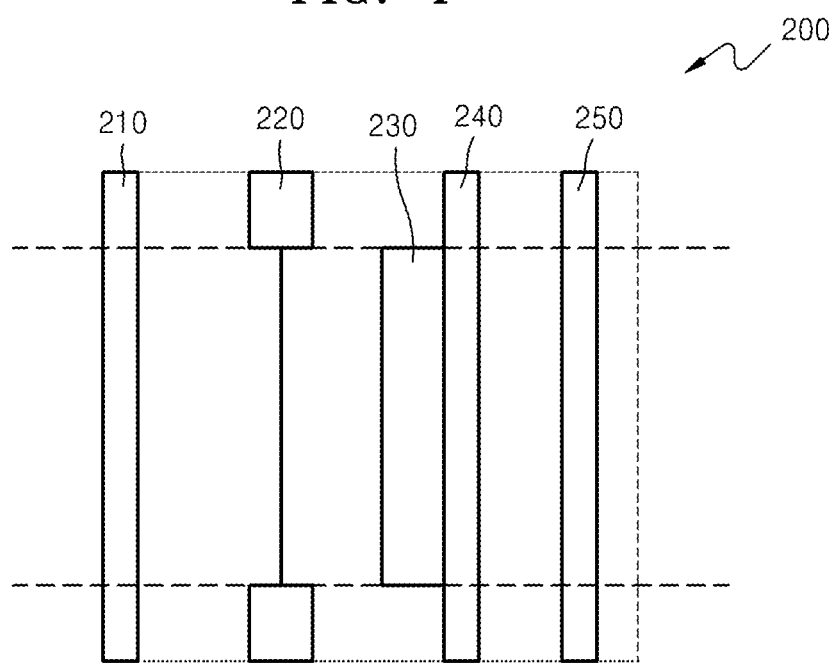
FIG. 4 is a detailed view of a smart mount, according to an embodiment.

Referring to FIGS. 3 and 4, the smart mount 200 includes a lens connecting unit 210 for connecting with the lens 100, a shutter 220, an image sensor 230, an image sensor PCB 240, an image processor 250, and a body connecting unit 260 for connecting with the body 300. Although not shown, function buttons for controlling operations for capturing and processing images are arranged outside the smart mount 200, and thus the smart mount 200 may capture and process images autonomously from controls of the body 300.

The image sensor 230 converts light incident via the lens 100 to charges via photo diodes (PD) and converts the charges to voltages. The image sensor 230 may be a charge coupled device (CCD) or a complementary metal oxide semiconductor image sensor (CIS). The image sensor 230 is mounted on the image sensor PCB 240, which includes a circuit for driving the image sensor 230.

The image processor 250 processes data input via the image sensor 230, stores the processed data in a storage unit (251 of FIG. 7) or compresses image data by using a codec, and provides interfaces for external devices.

If image signals input by the image sensor 230 are analog signals, the image processor 250 converts the image signals to digital signals and performs various image processes with respect to the converted digital signals. In detail, the image processor 250 enhances image quality by performing signal processes, such as auto white balance, auto exposure, gamma correction, etc. and outputs image signals with enhanced image quality. Furthermore, the image processor 250 performs various image processes, such as color filter array interpolation, color matrix, color correction, color enhancement, etc.

The smart mount 200 and the body 300 may communicate with each other wiredly/wirelessly. In a case of wired communication, images captured by the smart mount 200 may be transmitted to the body 300 in real time or may be supplied to the body 300 via various interfaces, such as a USB (261 of FIG. 7). In a case of wireless communication, data may be transmitted/received in real time via various communication methods, such as wireless fidelity (Wi-Fi), Bluetooth (BT), near field communication (NFC), etc. As the smart mount 200 supports wireless communication, the smart mount 200 may be linked to not only a dedicated camera body, but also to various mobile terminal devices capable of wireless communication, and thus high quality images may be provided by using a mobile terminal device.

Figure 5A:
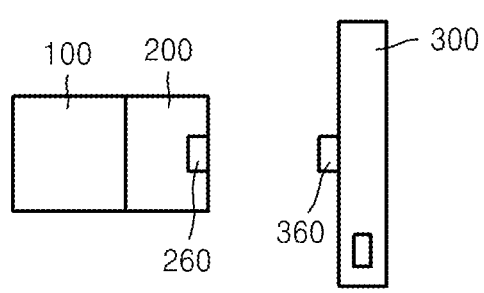
FIGS. 5A and 5B are diagrams showing a combination relationship between a smart mount and the body shown in FIG. 3, according to an embodiment.
Figure 5B:
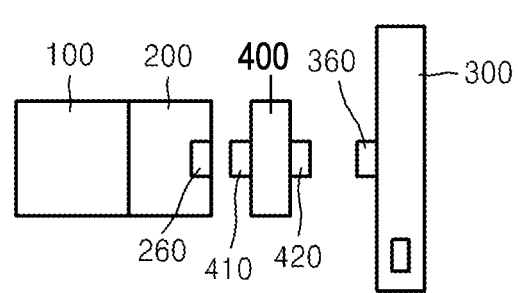

FIGS. 5A and 5B are diagrams showing a combination relationship between the smart mount 200 and the body 300 shown in FIG. 3, according to an embodiment.

Figure 7:
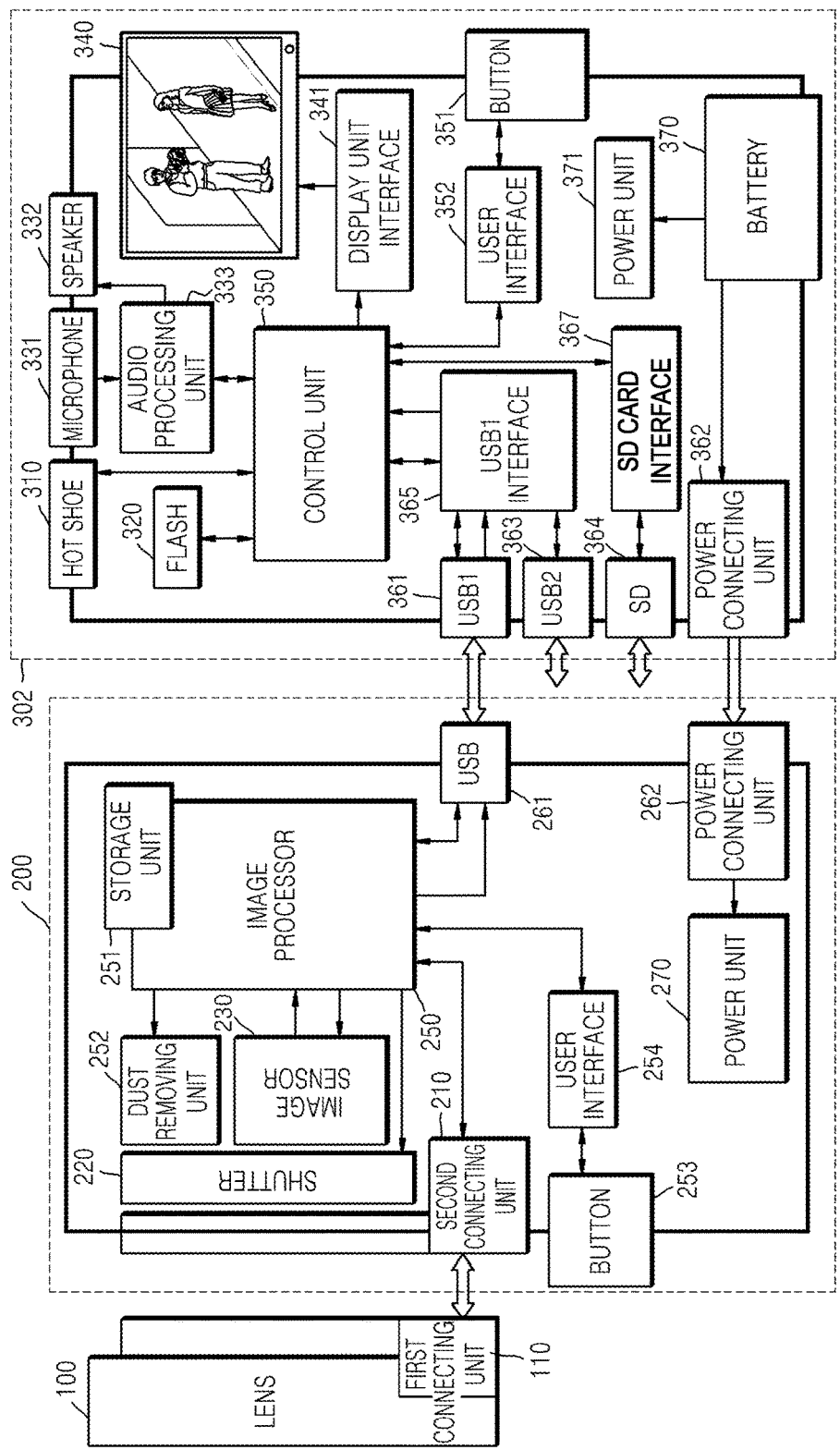
FIG. 7 is an internal view of the digital photographing system in a case where the body shown in FIGS. 2A to 2C is a camera body, according to an embodiment.

Referring to FIG. 5A, if the body 300, which may include the mobile terminal device 301 or the camera body 302, provides a contact point 360, like a conventional camera, the mobile terminal device 301 or the camera body 302 may be connected to the body connecting unit 260 of the smart mount 200 via the contact point 360 or an interface, such as a USB (261 and 361 of FIG. 7). Furthermore, a lens 100 may be connected to the smart mount 200.

Referring to FIG. 5B, the smart mount 200 and the body 300 may be connected to each other via a new adaptor 400 that provides a connection interface. The body connecting unit 260 of the smart mount 200 or a USB (261 of FIG. 7) is connected to a first end 410 of the adaptor 400, whereas the contact point 360 of the mobile terminal device 301 or the camera body 302 or the USB (361 of FIG. 7) is connected to a second end 420 of the adaptor 400. Furthermore, a lens 100 may be connected to the smart mount 200.

FIGS. 6A to 6D are diagrams showing the mobile terminal device 301 shown in FIGS. 1A to 1C downloading and executing an application and to control the smart mount 200, according to an embodiment.

In a case where the mobile terminal device 301 is used as the body 300, it is necessary to download and install a dedicated application for controlling the smart mount 200. Compared to the prior art, which is limited to firmware updates, various applications may be provided by the mobile terminal device 301, and thus the mobile terminal device 301 may modify high-quality images in various ways.

Figure 6A:
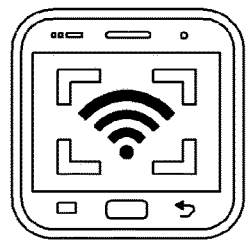
FIGS. 6A to 6D are diagrams showing a mobile terminal device shown in FIGS. 1A to 1C downloading and executing an application to control the smart mount, according to an embodiment.
Figure 6B:
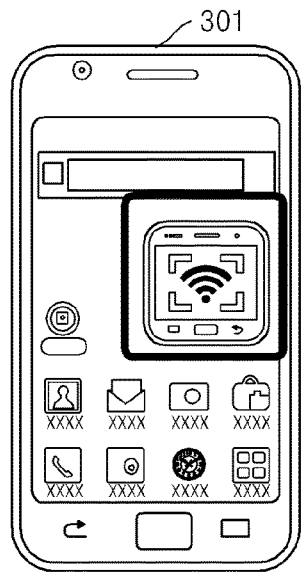
Figure 6C:
Figure 6D:
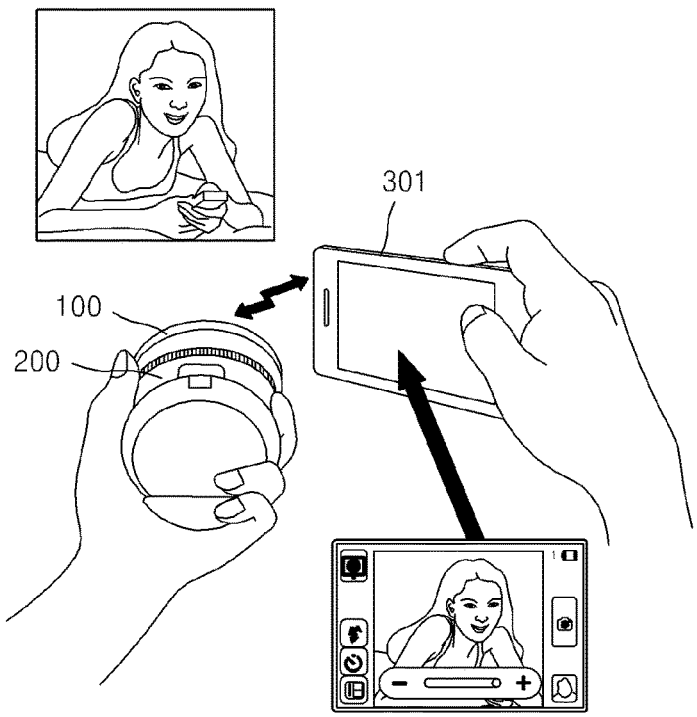

An example of connections between the smart mount 200 and the mobile terminal device 301 may include a Remote Viewfinder. The Remote Viewfinder is an application for connecting a camera to the mobile terminal device 301 to control the camera by using the mobile terminal device 301. First, a user downloads the Remote Viewfinder application from an application store (FIG. 6A) and installs the Remote Viewfinder to the mobile terminal device 301 (FIG. 6B). Next, the Remote Viewfinder is executed on the mobile terminal device 301 to connect the mobile terminal device 301 to the smart mount 200 (FIG. 6C). Here, it may be necessary to enter a password. Next, when the mobile terminal device 301 controls the smart mount 200 (flash on/off, timer, zoom, etc.) and captures an image, the smart mount 200 transmits the captured image to the mobile terminal device 301, and the mobile terminal device 301 displays, stores, or modifies the image (FIG. 6D). The smart mount 200 may be connected to the lens 100.

FIG. 7 is an internal view of the digital photographing system in a case where the body 300 is the camera body 302 as shown in FIGS. 2A to 2C, according to an embodiment.

Referring to FIG. 7, the digital photographing system includes the lens 100, the smart mount 200, and the camera body 302. Here, the camera body 302 may be replaced with the mobile terminal device 301.

The lens 100 collects optical signals from an object. The lens 100 includes a zoom lens for narrowing or widening a viewing angle according to focal lengths, and a focus lens for focusing on an object, etc., where the zoom lens and the focus lens may each include a single lens or a plurality of lenses. The lens 100 transmits collected optical signals to the smart mount 200. The lens 100 includes a first connecting unit 110 for connecting with the smart mount 200.

The smart mount 200 captures and processes images and is connected to the camera body 302. The smart mount 200 includes a second connecting unit 210 (identical to the lens connecting unit 360 shown in FIGS. 3 and 4) for connecting with the lens 100.

Furthermore, the smart mount 200 includes the shutter 220, which includes a front curtain (not shown) and a rear curtain (not shown). Here, the shutter 220 may be a focal plane shutter. Generally, a focal plane shutter is a shutter in which two fabric curtains or metal curtains installed right in front of a focal surface of a lens run horizontally or vertically, where a photosensitive material surface is appropriately exposed by adjusting a slit between the two curtains or adjusting moving speeds of the two curtains. A focal plate shutter is generally installed on lens-exchangeable cameras. Such a focal plane shutter is generally installed on cameras with 6×6 cm or smaller frames and determines exposure time by constantly maintaining a running speed of curtains and adjusting only a slit size by using a speed controller or an electrically-controlled electromagnet. The most distinguishing features of a focal plane shutter are that it has lens exchangeability and that it is an easy high-speed shutter.

Optical signals transmitted through the lens 100 form an image of an object on a light receiving surface of the image sensor 230. The image sensor 230 may be a charge coupled device (CCD), a complementary metal oxide semiconductor image sensor (CIS), or a high-speed image sensor that converts optical signals to electric signals.

The image processor 250 processes data input by the image sensor 230 and stores the processed data in a storage unit 251 or compresses image data by using a codec and provides interfaces for external devices.

The image processor 250 may perform image signal processes for image quality enhancement, such as noise reduction, gamma correction, color filter array interpolation, color matrix, color correction, color enhancement, etc. Furthermore, the image processor 250 may generate an image file by compressing image data generated by performing the image signal processes for image quality enhancement or may restore image data from the image file. Image compression formats may be non-lossy or lossy. Examples of the image compression formats may include RAW data, joint photographic experts group (JPEG), JPEG 2000, etc. Compressed data may be stored in the storage unit 251. Furthermore, the image processor 250 may perform various functions such as sharpening, blurring, edge enhancement, image analysis, image recognition, image effects, etc. Examples of the image recognition may include face recognition, scene recognition, etc. For example, various processes such as brightness level adjustment, color correction, contrast adjustment, edge enhancement, screen splitting, generation of character images, image synthesis, etc. may be performed.

Furthermore, the image processor 250 may receive control signals transmitted from the camera body 302 for various operations, such as photographing, auto-focus, zoom change, focus change, auto exposure correction, shutter driving, etc., perform corresponding operations, and control operations of components.

A dust removing unit 252 includes a dust sensor (not shown) and a piezoelectric device (not shown) for removing dust attached to the image sensor 230. The dust sensor may be a photo detector (not shown) for detecting light that is incident to the image sensor 230 and scattered by dust particles. The dust sensor may include a light transmitting unit (not shown) and a light receiving unit (not shown), where the light transmitting unit emits light toward dust attached to the image sensor 230, and the light receiving unit receives light reflected by the dust. The piezoelectric device vibrates the image sensor 230 according to a vibration signal. Generally, a piezoelectric device is a device that, when a crystal having an asymmetric crystalline structure is mechanically deformed by an external force, charges are induced to a surface of the crystal, electric polarization occurs, and thus subtle charges are generated. Such a piezoelectric device may have induced therein a mechanical deformation simultaneously as charges are formed by applying an electric field to the crystal. In other words, when a high frequency power corresponding to a resonance frequency unique to a piezoelectric device is applied to the piezoelectric device, the piezoelectric device vibrates at its resonant frequency. The dust removing unit 252 detects an amount of dusts via the dust sensor and transmits a vibration signal to the piezoelectric device, so that dust attached to the image sensor 230 is shaken off.

Furthermore, the smart mount 200 may include a button 253. Here, the button 253 refers to a button capable of independently driving the smart mount 200 without control of the camera body 302, e.g., a shutter-release button for inputting a shutter-release signal for capturing an image by exposing the image sensor 230 to light for a predetermined period of time or a power button for turning the smart mount 200 on/off in a case where the smart mount 200 includes a battery.

A user interface 254 receives input of the button 253 and transmits a corresponding signal to the image processor 250.

When smart mount 200 is connected to the camera body 302 via a USB 261, various signals are transmitted to the camera body 302 via the USB 261.

A power connecting unit 262 receives power from the camera body 302 and supplies the received power to a power unit 270. Here, if the smart mount 200 is connected to the camera body 302 wiredly, the power connecting unit 262 and the power unit 270 operate based on power transmitted from the camera body 302. However, if the smart mount 200 is connected to the camera body 302 wirelessly, the smart mount 200 includes its own battery (not shown) and operates therewith.

The camera body 302 receives an image captured and processed by the smart mount 200 and displays, stores, deletes, or modifies the image.

The camera body 302 includes a hot shoe 310, a flash 320, a microphone 331, a speaker 332, an audio processing unit 333, a display unit 340, a display unit interface 341, a control unit 350, buttons 351, a user interface 352, a first USB 361, a power connecting unit 362, a second USB 363, an SD 364, a USB interface 365, a SD card interface 367, a battery 370, and a power unit 371.

The hot shoe 310 is a flash connecting unit of the camera body 302, and the flash 320 is a light-emitting device for momentarily illuminating an object in a case of photographing in a dark environment.

The microphone 331, the speaker 332, and the audio processing unit 333 may output audio signals to perform functions including notification of an operating status during a photographing operation. Type and volume of audio signals of the speaker 332 may be controlled by the audio processing unit 333.

The display unit 340 displays image signals transmitted from the smart mount 200 to a user as a predetermined image. The display unit 340 may also function as a viewfinder unit that continuously displays image signals acquired by the image sensor 230 during a photographing operation to determine a photographing range. The display unit 340 may be any of various types of display devices, such as a liquid crystal display (LCD), an organic light emitting display (OLED), an electronic display device (EDD), etc.

The display unit interface 341 transmits and receives various control signals for driving the display unit 340 under control of the control unit 350.

The control unit 350 processes data based on a stored operating system and application programs, temporarily stores a result of the processing of the data, and controls a corresponding component according to the result of the processing of the data. Particularly, the control unit 350 provides live-view images transmitted from the smart mount 200 for determining a photographing range to the display unit 340, transmits an image capturing signal to the smart mount 200, and displays an image captured by the smart mount 200 on the display unit 340. Furthermore, the control unit 350 provides various functions for modifying an image displayed on the display unit 340 and stores an image displayed on the display unit 340 or modified in the SD 364 via the SD card interface 367 or to delete an image stored in the SD 364.

The buttons 351 are a unit via which control signals may be input from outside, such as a user. The buttons 351 may include a shutter-release button for inputting a shutter-release signal for capturing an image by exposing an image sensor 115 to light for a predetermined period of time, a power button for inputting a control signal for turning the camera body 302 on/off, a wide angle zoom button and a telescope zoom button for widening or narrowing a viewing angle, a mode selecting button for selecting various modes, such as a text inputting mode, a photographing mode, a playback mode, etc., a white balance setting function selecting button, an exposure setting function selecting button, etc. The buttons 351 may include various buttons as described above. However, the invention is not limited thereto, and the buttons 351 may be embodied in any of various types of user input devices, such as a keyboard, a touchpad, a touch screen, a remote controller, etc. The user interface 352 transmits various button input signals to the control unit 350.

The first USB 361 or the second USB 363 is connected to the USB 261 of the smart mount 200 and transmits and receive various signals.

The power connecting unit 362 is connected to the power connecting unit 262 of the smart mount 200 and transmits power from the battery 370 to the smart mount 200.

Power from the battery 370 is also supplied to the power unit 371 to drive the camera body 302.

The smart mount 200 and the camera body 302 may communicate with each other wiredly/wirelessly. In a case of wired communication, images captured by the smart mount 200 may be transmitted to the camera body 302 in real time or may be supplied to the camera body 302 via various interfaces, such as a USB 261. In a case of wireless communication, data may be transmitted/received in real time via various communication methods, such as wireless fidelity (Wi-Fi), Bluetooth (BT), near field communication (NFC), etc. As the smart mount 200 supports wireless communication, the smart mount 200 may be linked to not only a dedicated camera body, but also to various mobile terminal devices capable of wireless communication, and thus high quality images may be provided by using a mobile terminal device.

If the smart mount 200 and the camera body 302 are connected to each other wiredly, the smart mount 200 and the camera body 302 may perform data communication with each other via the USBs 261 and 361. However, if the smart mount 200 and the camera body 302 are connected to each other wirelessly, although not shown, the smart mount 200 and the camera body 302 include wireless communication modules, and thus the smart mount 200 and the camera body 302 may perform data communication with each other via the wireless communication modules.

Figure 8:
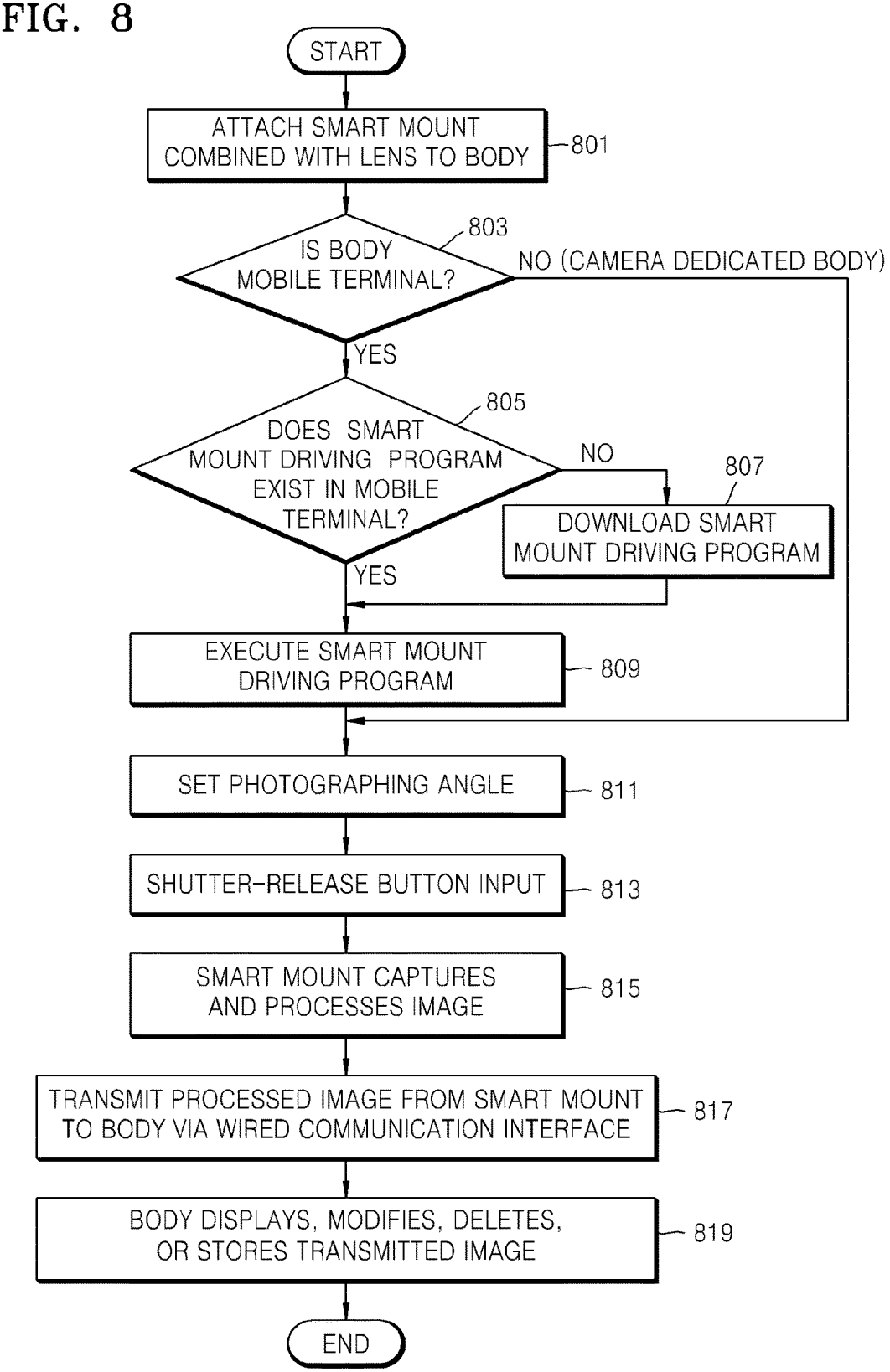
FIG. 8 is a flowchart showing a method of operating a digital photographing system, according to an embodiment.

FIG. 8 is a flowchart showing a method of operating a digital photographing system, according to an embodiment.

Referring to FIG. 8, a user attaches the smart mount 200 combined with the lens 100 to the body 300 (operation S801). Here, the smart mount 200 includes the shutter 220, the image sensor 230, the image sensor PCB 240, and the image processor 250 for capturing and processing images. Furthermore, the body 300 may be the mobile terminal device 301 or the camera body 302 for displaying, modifying, deleting, or storing images captured and processed by the smart mount 200.

When the smart mount 200 is attached to the body 300 and power is supplied thereto, the body 300 determines whether the body 300 to which the smart mount 200 is currently attached is the mobile terminal device 301 or the camera body 302 (operation S803).

If the body 300 is the mobile terminal device 301, it is determined whether a smart mount driving program exists (operation S805).

If no smart mount driving program exists in the mobile terminal device 301, a user may download a smart mount driving program from an application store (e.g., Remote Viewfinder) (operation S807) and execute the smart mount driving program (operation S809).

A photographing angle is set while live-view image is displayed on the mobile terminal device 301 or the camera body 302 (operation S811). When the photographing angle is set, a user presses the shutter-release button arranged on the mobile terminal device 301 or the camera body 302 (operation S813).

According to a shutter-release button input signal, the smart mount 200 captures an image of the current photographing angle and processes the image to displayable image signals (operation S815).

Next, the smart mount 200 transmits the displayable image signals to the mobile terminal device 301 or the camera body 302 via a wired communication interface, e.g., the USBs 261 and 361 (operation S817).

The mobile terminal device 301 or the camera body 302 displays, modifies, stores, or deletes the image signals received from the smart mount 200 (operation S819).

FIG. 9 is a flowchart showing a method of operating a digital photographing system, according to another embodiment.

Referring to FIG. 9, a wireless communication environment is established between the smart mount 200 attached to the lens 100 and the body 300 (operation S901). Here, the smart mount 200 includes the shutter 220, the image sensor 230, the image sensor PCB 240, and the image processor 250 for capturing and processing images. Furthermore, the body 300 may be the mobile terminal device 301 or the camera body 302 for displaying, modifying, deleting, or storing images captured and processed by the smart mount 200. When a user turns on the smart mount 200 and the body 300, the body 300 transmits a signal indicating initiation of wireless communication to the smart mount 200, and the smart mount 200 receives the signal indicating initiation of wireless communication, a wireless communication environment is established between the smart mount 200 and the body 300. The smart mount 200 and the body 300 include wireless communication modules, and thus the smart mount 200 and the body 300 may perform wireless communication with each other.

When the wireless communication environment established between the smart mount 200 and the body 300, the body 300 determines whether the body 300 to which the smart mount 200 is currently attached is the mobile terminal device 301 or the camera body 302 (operation S903).

If the body 300 is the mobile terminal device 301, it is determined whether a smart mount driving program exists (operation S905).

If no smart mount driving program exists in the mobile terminal device 301, a user downloads a smart mount driving program from an application store (e.g., Remote Viewfinder) (operation S907) and execute the smart mount driving program (operation S909).

A photographing angle is set as viewing live-view images displayed on the mobile terminal device 301 or the camera body 302 (operation S911). Since the smart mount 200 is not physically attached to the mobile terminal device 301 or the camera body 302 and is wirelessly connected to the mobile terminal device 301 or the camera body 302, a user may move the smart mount 200 and set a photographing angle. Here, a photographing angle set by the smart mount 200 is displayed as live-view images on the mobile terminal device 301 or the camera body 302 wirelessly.

When the photographing angle is set, a user presses the shutter-release button arranged on the mobile terminal device 301 or the camera body 302 (operation S913).

According to a shutter-release button input signal, the smart mount 200 captures an image of the current photographing angle and processes the image to displayable image signals (operation S915).

Next, the smart mount 200 wirelessly transmits the displayable image signals to the mobile terminal device 301 or the camera body 302 via a wireless communication interface (not shown) (operation S917).

The mobile terminal device 301 or the camera body 302 displays, modifies, stores, or deletes the image signals received from the smart mount 200 (operation S919).

In a conventional lens-exchangeable camera system, it is impossible to simultaneously embody both high optical performance of lenses and compact design due to a flange-back distance, that is, a distance between a mount or a rear surface of a lens and a sensor or limits for securing back focus. Therefore, in a conventional lens-exchangeable camera system, both an image sensor and an image processor exist within a camera body, and thus the camera body becomes large and heavy. Furthermore, there are many other inconveniences, e.g., it is necessary for a user to perform additional tasks for communicating with an external mobile terminal device. However, according to the various embodiments, the smart mount 200 including the lens 100, the shutter 220, the image sensor 230, and the image processor 250 is provided separately from the camera body 302 or the mobile terminal device 301, and thus a size of a digital photographing system may be significantly reduced.

Although a camera unit exchangeable camera system has more flexibilities than a lens-exchangeable camera, it is necessary that a dedicated connector be used. Furthermore, there are other technical problems. For example, users must use camera unit exchangeable camera dedicated bodies, and communication with other mobile terminal devices is difficult. However, the smart mount 200 may be connected to various mobile terminal devices, and the smart mount 200 may be controlled on the mobile terminal device 301 by using a dedicated application. Furthermore, high-quality image data may be acquired by using the mobile terminal device 301.

An iPhone camera lens mount is an adaptor for simply connecting conventional DSLR lenses to an iPhone. In a case of displaying an image on an iPhone by using the adaptor, the image is displayed upside down. The reason is that light input through a lens is input as-is to a camera attached to an iPhone. In a case of an iPhone camera lens mount, images are captured and processed by an iPhone. Therefore, quality of the images is the same as that of images captured by using conventional mobile terminal devices. However, since the smart mount 200 includes the image sensor 230 and the image processor 250, all operations are performed by the smart mount 200, and only results of the operations are transmitted to the mobile terminal device 301 or the camera body 302. Therefore, compared to an iPhone camera lens mount, the smart mount 200 may transmit high-quality images to the mobile terminal device 301 or the camera body 302, and a user of the smart mount 200 may acquire high-quality images by using the mobile terminal device 301 via the lens 100 and the image sensor 230 with higher efficiency as compared to a conventional mobile device camera.

Furthermore, a digital photographing system according to various embodiments supports wired/wireless communication. Therefore, the digital photographing system may be linked not only to dedicated camera bodies, but also to mobile terminal devices. Therefore, high-quality images may be captured by using a mobile terminal device, captured images may be easily uploaded to the Internet, and high-quality image modifications may be performed by using a mobile terminal device.

All references, including publications, patent applications, and patents, cited herein are hereby incorporated by reference to the same extent as if each reference were individually and specifically indicated to be incorporated by reference and were set forth in its entirety herein.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

It will be recognized that the terms "comprises," "comprising," "includes," "including," "has," and "having," as used herein, are specifically intended to be read as open-ended terms of art. In addition, it should be understood that although the terms "first," "second," etc. may be used herein to describe various elements, these elements should not be limited by these terms, which are only used to distinguish one element from another.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A digital photographing system comprising:
    a photographing apparatus including a lens and a shutter button, the photographing apparatus captures and processes an image of an object input via the lens and, via a transmitter, transmits captured and processed images to an external device via wireless communication, wherein the photographing apparatus captures the image of the object via a capturing signal from the shutter button or the external device; and
    an adaptor for attaching the photographing apparatus to the external device, wherein the adaptor is removably attached to the external device;
    wherein: both the photographing apparatus and the adaptor have a generally cylindrical shape, the captured and processed image is saved on the photographing apparatus before being transmitted to the external device.

2. The digital photographing system of claim 1, wherein the photographing apparatus comprises:
    a lens connecting unit that connects with the lens;
    a shutter;
    an image sensor that converts object light incident via the lens to electric signals according to an input of the shutter; and
    an image processing unit that processes data from the image sensor to displayable or storable signals and transmits the displayable or storable signals to the external device.

3. The digital photographing system of claim 2, wherein the photographing apparatus further comprises a storage unit that stores an image.

4. The digital photographing system of claim 1, wherein the photographing apparatus is operable to be detached from the external device.

5. The digital photographing system of claim 1, wherein the photographing apparatus transmits captured and processed images to the external device while the photographing apparatus is detached from the external device.

6. The digital photographing system of claim 1, wherein the photographing apparatus captures and processes images according to control signals received from the external device while the photographing apparatus is detached from the external device.

7. The digital photographing system of claim 1, wherein the photographing apparatus performs near field communication (NFC) with the external device.

8. The digital photographing system of claim 1, wherein the adaptor engages a portion of a side wall of the external device.

9. The digital photographing system of claim 1, wherein the photographing apparatus is attached to the external device via a connecting unit arranged inside the photographing apparatus.

10. The digital photographing system of claim 1, wherein the photographing apparatus comprises a battery for autonomous power supply.

11. The digital photographing system of claim 1, wherein the external device comprises at least one of a digital camera body and a mobile terminal device.

12. The digital photographing system of claim 1, wherein the external device controls an image capturing operation and an image processing operation of the photographing apparatus.

13. The digital photographing system of claim 1, wherein:
    the external device is a mobile terminal device; and an application for controlling an image capturing operation and an image processing operation of the photographing apparatus is downloaded and executed on the mobile terminal device.

14. A method of operating a digital photographing system, the method comprising:
    attaching a photographing apparatus that is operable to capture and process images to an external device via an adaptor, wherein: the photographing apparatus includes a lens and a shutter button, and the adaptor is removably attached to the external device;
    receiving an image capture signal from the shutter button or the external device, wherein the photographing apparatus is responsive to receiving the image capture signal from the shutter button and is responsive to receiving the image capture signal from the external device; and
    capturing and processing an image using the photographing apparatus when the photographing apparatus receives the image capturing signal, and transmitting, via a transmitter, the image to the external device via wireless communication;
    wherein: both the photographing apparatus and the adaptor have a generally cylindrical shape, the captured and processed image is saved on the photographing apparatus before being transmitted to the external device.

15. The method of claim 14, wherein, if the external device is a mobile terminal device, downloading an application for controlling an image capturing operation and an image processing operation of the photographing apparatus and executing the application on the mobile terminal device.

16. The method of claim 15, wherein the photographing apparatus either receives power supplied from the external device or comprises a battery for autonomous power supply.

17. The method of claim 14, wherein the photographing apparatus performs near field communication (NFC) with the external device.

18. The method of claim 14, wherein when a predetermined password is entered to the external device, the external device is connected to the photographing apparatus via the wireless communication.

19. The method of claim 14, wherein the adaptor engages a portion of a side wall of the external device.

20. A non-transitory computer program product, comprising a computer usable medium having a computer readable program code embodied therein, the computer readable program code adapted to be executed to implement the method of claim 14.

* * * * *